United States Patent [19]

Huh

[11] Patent Number: 5,639,588
[45] Date of Patent: Jun. 17, 1997

[54] ORGANIC OPTICAL RECORDING MEDIUM

[75] Inventor: Young Jae Huh, Seoul, Rep. of Korea

[73] Assignee: Samsung Electronics Co., Ltd., Kyoungki-do, Rep. of Korea

[21] Appl. No.: 488,363

[22] Filed: Jun. 7, 1995

[30] Foreign Application Priority Data

Jan. 28, 1995 [KR] Rep. of Korea ................. 95-1705

[51] Int. Cl.$^6$ ..................................... G11B 7/24
[52] U.S. Cl. ................... 430/270.15; 430/18; 430/945
[58] Field of Search ............................. 430/270, 271, 430/495, 945, 270.15, 271.1, 18; 369/288, 284

[56] References Cited

U.S. PATENT DOCUMENTS

| | | | |
|---|---|---|---|
| 4,851,323 | 7/1989 | Maeda | 430/270.14 |
| 4,860,273 | 8/1989 | Sawano et al. | 369/100 |
| 4,901,304 | 2/1990 | Lind et al. | 369/284 |

FOREIGN PATENT DOCUMENTS

| | | |
|---|---|---|
| 57-46362 | 3/1982 | Japan . |
| 58-197088 | 11/1983 | Japan . |
| 60-20839 | 2/1985 | Japan . |
| 62-109245 | 5/1987 | Japan . |
| 63-163341 | 7/1988 | Japan . |
| 63-179792 | 7/1988 | Japan . |
| 1-206093 | 8/1989 | Japan . |
| 2-84384 | 3/1990 | Japan . |

*Primary Examiner*—John A. McPherson
*Attorney, Agent, or Firm*—Burns, Doane, Swecker & Mathis, L.L.P.

[57] ABSTRACT

Disclosed is an organic optical recording medium comprising a substrate, a recording layer on the substrate, a reflective layer and protective layer disposed on the recording layer, wherein the recording layer has a refractive index of 1.7 or less and includes an organic dye and a mixture of two or more polymers having different thermal properties and compatibilities from an ambient temperature to 80° C. The organic optical recording medium of the present invention has improved recording characteristics and good processability and is inexpensive.

4 Claims, No Drawings

ORGANIC OPTICAL RECORDING MEDIUM

BACKGROUND OF THE INVENTION

The present invention relates to an organic optical recording medium which is recordable and readable by using a laser beam and useful as a medium for recording various information and images. The medium can take the form of an optical disc, an optical tape, an optical card, etc. More particularly, the present invention relates to an economical organic optical recording medium which is capable of achieving good processability and recording characteristics by employing a recording layer including an organic dye and a mixture of two or more polymers having different thermal properties.

With the explosion of a variety of information in accordance with an orientation toward an information-intensive society, recording media have been required to have increased data storage density and increased storage capacity. In correspondence to this need, research on the information recording medium having higher density, larger capacity and higher speed is actively pursued. In particular research is concentrated on the development of conventional magnetic recording medium and optical recording medium to have high density. However, research on ultra high densification through use of a novel optical recording material or a novel recording method is also actively pursued.

Japanese Laid-open Patent 60-20839, 62-109245 and 63-163341 disclose optical recording using photochromic material and optical recording using PHB (photochemical hole burning, Nikkei New Materials, Apr. 11th, 99, 1988) as a novel optical recording material. Though much concern was concentrated on the materials for ultra high densification, many problems still exist in practical use thereof. It is true that producing the material on a commercial scale seems difficult in the near future.

Therefore, recent studies on developing effective and economical methods for manufacturing the recording medium using the conventional method are in progress, rather than developing new recording materials or new recording methods. And the results of these studies gradually are being realized. CD-(Compact Disc-Recordable), the representative example, solves the most important problem of CD's, i.e., the problem of it being impossible to write information on the conventional CD, the CD-R enabling the user to record information. The CD-R can be played using a conventional compact disc player (CDP) and so demand for the CD-R is increasing. However, the CD-R disc should show high reflectivity of 70% or above to be compatible with conventional CD's. Accordingly, other CD-R discs, except for dye-type which was developed by Taiyo Yuden, have not been developed. See Japanese Laid-open Patent 63-179792, hei 1-206093 and hei 2-84384.

Meanwhile, besides optical discs which use dye as a recording material such as the CD-R disc, an optical magnetic disc using optomagnetic phenomena of metal and a metal phase change optical disc using the phase change of metal alloy, etc. have been developed. However, there are many difficulties associated with the preparation of these optical recording media as heavy metals are used and apparatus for vacuum deposition or sputtering, which is expensive and complicated, is required. These processes give rise to increased production cost and decreased productivity. Therefore, research on using organic material which is inexpensive and has good processability for the optical recording material has been pursued. See Japanese Laid-open Patent 57-46362, 58-197088 and U.S. Pat. No. 4,901,304.

However, most of the conventional recording methods using organic material employ thermal deformation or thermal decomposition of the recording material i.e., the organic material, by the heat generated during light exposure. In these methods, expensive curing resin is used as a recording material (see U.S. Pat. No. 4,901,304) or a large quantity of expensive dye is used for the thermal decomposition of the components (japanese Laid-open Patent 57-46362 and 58-197088), and then, the curing process is somewhat complicated.

SUMMARY OF THE INVENTION

An object of the present invention is to overcome the above problems encountered in the prior art and to provide an optical recording medium which achieves satisfactory recording operation and superior workability.

Another object of the present invention is to provide an economic organic optical medium having good recording characteristics and good processability.

The present invention relates to an optical recording medium comprising a substrate, a recording layer of a dye-containing recording material on the substrate, a reflective layer and a protective layer disposed in sequence on the recording layer, characterized in that the recording layer has a refractive index of 1.7 or less and includes an organic dye and a mixture of two or more polymers which have different thermal properties and are compatible with each other from ambient temperature to 80° C.

DETAILED DESCRIPTION OF THE INVENTION

The present invention will be described in detail below.

As for the optical recording material of the recording layer having refractive index of 1.7 or less, polymers such as acryls, styrenes, acetates, epoxys, fluoric resins, etc. can be illustrated. Of particular preference are widely used and inexpensive polymers such as polymethyl methacrylates (PMMA), polycarbonates(PC), polyvinyl acetates(PVAc), polyvinyldene fluorides(PVDF), etc. In addition, in the present invention, the polymer mixture of the recording layer should be prepared by mixing two or more polymer materials having different thermal properties in an organic solvent. At this time, the difference in thermal properties means a difference in thermal expansion coefficients, thermal decomposition temperatures, glass transition temperatures, etc. When the thermal properties of the components are eminently differ greater, each component shows a different thermal profile after absorbing light. As a result, the degree of the thermal deformation or thermal decomposition in the affected area becomes larger to give improved recording characteristics.

The two or more polymers in the polymer mixture should be substantially compatible at temperatures from ambient temperature to 80° C. If the two components have no compatibility, the two polymers come to exist in a separate state after coating the mixture on the substrate resulting in reflectivity deterioration. Furthermore, the separated polymers sometimes form domains and so the optical recording is difficult. The two or more polymers should be thermally stable at from ambient temperature to 80° C. which is generally required temperature range in the optical recording medium.

Co-polymers can be used in the present invention as the recording material of the recording layer to obtain various polymer mixture combinations having more complex thermal deformation and compatibility than homo-polymers.

Examples of suitable copolymers include acrylate co-polymers, styrene co-polymers, etc.. Where the foregoing copolymers are employed, it is simple to change thermal properties of the polymers by varying the amount of the constituents.

In selecting the polymer material in the present invention, the glass transition temperature of the mixture consisting of at least two polymers should be 40~150° C. for the stability after recording. That is, if the glass transition temperature of the polymer mixture is less than 40° C., the medium is unstable and can not be used as the optical recording medium. If the temperature exceeds 150° C., a large amount of thermal energy is needed during recording. For this reason, polymers having the glass transition temperature in the above range are preferred.

As describe above, when the mixture of two or more polymers having a large difference in thermal properties is used as the optical recording material, the thermal deformation in the recording area is enhanced due to the different thermal behaviors of two or more polymers during heat generation after light absorption. The result is improved recording characteristics so information recording is possible with lower laser power. For example, when using a polymer mixture composed of two or more polymers having remarkably different thermal expansion coefficients, the exposed region is deformed more clearly to improve the recording characteristics when compared with the use of only one polymer material. Where polymers which have a remarkable difference in thermal decomposition temperature and thermal deformation temperatures, difference in thermal deformation degrees and thermal deformation are employed hysteresis is generated between the materials to form a clear recording portion. As well, noise generation due to excessive thermal deformation which might be shown when using materials having low thermal deformation temperature, could be reduced to improve the recording characteristics.

In manufacturing the recording layer of the organic optical recording medium of the present invention, an effective amount of organic dye as a light absorbent should be mixed with the above optical recording material to prepare a coating solution. As for the light absorbant dyes any suitable dye may be used. Example of suitable dyes include cyanine, phthalocyanine, naphthalocyanine, croconium, polymethine, etc. The preferred addition amount of the dye is 1.0~30 wt % based on the total polymer material. If the amount of dye is less than 1 wt %, the light absorption is too weak and the power of the recording light should be increased uneconomically. Meanwhile, if the amount exceeds 30 wt %, a part of the dye having low solubility might not be dissolved and consumption of a large amount of the expensive dye results in uneconomical manufacturing.

In the present invention, the recording layer comprising an organic dye and a polymer mixture is formed by dissolving the resulting organic dye/polymer in an appropriate solvent in an appropriate concentration of 0.1~0.2 g/10 ml and coating the resulting solution on the substrate. This coating may be preformed by art-recognized techniques, such as a dip coating process, a spray coating process, a spin coating process, a roll coating process and a bar coating process. A spin-coating process is most preferred because it allows for a high degree of control of film thickness and flatness.

In manufacturing a coating solution by dissolving the polymer materials in an organic solvent, the preferred concentration of the polymer is 2.0~30 wt % based on the solvent. If the concentration of the polymer is less than 2 wt %, a very thin optical layer is undesirably formed. If the concentration exceeds 30 wt %, viscosity of the solution is increased and a uniform recording layer could not be formed. In addition, the thickness of the recording layer becomes thicker than an appropriate level and fine control of the thickness is difficult.

The disc using the organic optical medium of the present invention is manufactured as follows. The polymer/organic dye solution is coated at a velocity of 1000~3000 rpm using a spin-coater on the PC or amorphous polyolefin(APO) substrate having pre-grooves to form a recording layer. A reflective layer having uniform thickness is formed on the recording layer by sputtering Au, Au-Pd alloy, Al, etc. thereon. A protective layer is formed thereon by coating an ultraviolet curable resin to avoid physical and chemical damage in the recording and reflective layers.

In manufacturing a tape using the organic recording medium of the present invention, the polymer/organic dye solution is coated on an aluminum deposited substrate and then dried to form a recording layer. In turn, a protective layer is formed by coating a curable coating agent thereover.

Suitable materials for the substrate include materials exhibiting good structural integrity against warping and mechanical strength. Examples of suitable materials include plastic substrates formed by injection molding a transparent resin such as amorphous polyolfins(APO), polymethylmethacrylates, and polycarbonates and glass. PET film can also be used as a substrate.

Appropriate materials for the reflective layer in the present invention are highly reflective metals, such as aluminum, silver, copper or alloys thereof. Preferably the reflective layer is formed by sputtering gold or aluminum of 50~2500 Å thickness. The protective layer is formed using materials having the same or similar properties with respect to the substrate material. Polycarbonates are preferred.

Writing of information on the optical recording medium is conducted by focusing a laser beam within 1 μm on the optical recording medium. Under irradiation with the laser beam, the focused area of the recording layer of the optical recording medium absorbs energy of the beam and a rise in temperature locally occurs, and as a result chemical or physical change is caused to alter (or change) optical characteristics of the recording layer in the focused area, whereby the recording of information can be made. More particularly, if a laser beam is focused on the optical recording medium of the present invention, the polymer in the recording layer absorbs the laser and is melted or decomposed. In result, the optical characteristic of the recording layer is altered, for example, by forming pits in the recording layer.

Reading of information from the optical recording medium is also conducted by focusing the information track with a laser beam. The reproducing beam has a constant intensity at a level insufficient to effect recording in the recording layer. The information can be reproduced by detecting the difference in the optical characteristic (e.g., reflectivity difference) between the recorded part and the unrecorded part as logic 1 or 0.

The organic optical recording medium of the present invention exhibits good recording characteristics even at low recording laser powers because the thermal deformation or thermal decomposition is enhanced by virtue of the difference in thermal properties of the two or more polymers when the medium generates heat after the light absorption. Moreover, since inexpensive polymers and a small amount of dyes are used as the recording material, the production cost is lowered and the processability is improved.

The present invention is further illustrated by the following examples. The details in the following examples, however, are in no way meant to be limitative, but rather merely illustrative.

EXAMPLE 1

Au was deposited in 700 Å thickness on an APO substrate having a Wobble groove on the surface thereon. 0.5 g of PMMA (manufactured by Polyscience, Mw=100,000, Tg=98° C.), 0.5 g of PVAc (manufactured by Polyscience, Mw=90,000, Tg=28° C.) and 0.6 g of organic dye, CY-9 (manufactured by Nippon Kayaku Co.,Ltd.) were dissolved in 20 ml of 1,2-dichloroethane solvent. The resulting solution was then coated on the APO substrate at a velocity of 1500 rpm for 60 seconds using a spin-coater and was completely vacuum dried for 2 days to complete manufacture of an optical recording disc. An 8 mW laser beam ($\lambda$=780 nm) was focused to the obtained organic optical recording medium under the condition of a velocity of 1.2 m/sec and a frequency of 720 KHz to record information. The recording characteristics of the obtained optical disc were tested in an optical disc tester (commercially available from Apex Co: OHMT-500). The results of the test are illustrated in table 2.

EXAMPLE 2~3

An optical recording medium was prepared in a similar manner to that of Example 1, except that the components of the recording layer as shown in table 1 were used. Recording characteristics of the resulting optical recording medium was tested. The results of the test are illustrated in table 2.

Comparative Example 1

An optical recording medium was prepared in a similar manner to that of Example 1, except that a coating solution prepared by dissolving 1.0 g of PMMA and 0.08 g of organic dye, CY-9 as the polymer materials of the recording layer in 1,2-dichloroethane solvent was used. Recording characteristic of the resulting optical recording medium was tested. The results of the test are illustrated in table 2.

Comparative Example 2~3

An optical recording medium was prepared in a similar manner to that of Example 1, except that the compositions of the polymer materials and organic dyes of the recording layer were changed as in table 1. Recording characteristics of the resulting optical recording media were tested. The results of the test are illustrated in table 2.

TABLE 1

| | polymer 1 | polymer 2 | organic dye | solvent |
|---|---|---|---|---|
| Example 1 | PMMA 0.5 g | PVAc 0.5 g | CY-9 0.06 g | 1,2-dichloroethane 20 ml |
| Example 2 | PMMA 0.5 g | poly (methyl-co-2-ethylhexyl acrylate) (synthesized, MA/EHA = 85/15) Tg = 5° C., 0.5 g | CY-9 0.05 g | 1,2-dichloroethane 20 ml |

TABLE 1-continued

| | polymer 1 | polymer 2 | organic dye | solvent |
|---|---|---|---|---|
| Example 3 | PMMA 0.5 g | SAN(styrene-acrylonitrile) AN content 28 wt %, Tg = 97° C., 0.5 g | CY-9 0.08 g | 1,2-dichloroethane 20 ml |
| Comparative Example 1 | PMMA 1.0 g | | CY-9 0.08 g | 1,2-dichloroethane 20 ml |
| Comparative Example 2 | PMMA 1.6 g | PVAc 1.6 g | CY-9 0.12 g | 1,2-dichloroethane 20 m $\overline{\pi}$ |
| Comparative Example 3 | poly (ethyl acrylate 0.5 g | poly(methyl-co-2-ethylhexyl acrylate) (synthesized, MA/EHA = 85/15), Tg = 5° C., 0.5 g | CY-9 0.05 g | 1,2-dichloroethane 20 m $\overline{\pi}$ |

TABLE 2

| | reflectivity (%) | C/N ratio | recording layer coating state |
|---|---|---|---|
| Example 1 | 68 | 48 | good |
| Example 2 | 70 | 47 | good |
| Example 3 | 58 | 49 | good |
| Comparative Example 1 | 60 | 39 | good |
| Comparative Example 2 | 25 | 31 | bad |
| Comparative Example 3 | 68 | 33 | normal |

As shown in the table 2, the organic optical recording media of the present invention using the mixture of two or more polymers having remarkably different thermal properties as a recording material, exhibited C/N ratio of 45 dB or over. The media were provided with good recording characteristics which means they could serve as optical media. Particularly, the media exhibited high reflectivity of about 70% according to the kind of used material and so the media could be used for the CD-R.

On the contrary, even the coating state of the organic layer of the organic recording medium using only PMMA as the polymer material according to the comparative example 1 was good, C/N ratio was 39 dB giving bad recording characteristics. In the comparative example 2, since the concentration of the polymer exceeded 30 wt %, the viscosity was increased and the recording characteristics were bad. In case of using two polymers having low glass transition temperatures as in the comparative example 3, the recorded part was unstable. After storing the medium for three months, C/N ratio was lowered to 10% or more. It was found that the storage characteristic of Example 3 was bad.

What is claimed is:

1. An organic optical recording medium comprising:

a substrate;

a recording layer on the substrate;

a reflective layer; and a protective layer disposed on the recording layer, wherein said recording layer has a refractive index of 1.7 or less and includes an organic dye and a mixture of two or more polymers having different thermal properties which polymers are compatible at all temperatures from ambient temperature to 80° C., wherein the recording layer is produced from a coating solution which includes a solvent, wherein a concentration of said polymers is 2.0–30 wt % based on said solvent; land wherein the two or more polymers comprise polymethyl methacrylate and poly(methyl-co-2-ethylhexyl acrylate).

2. An organic optical recording medium as claimed in claim 1, wherein an amount of said organic dye is 1.0–30 wt % based on said polymers.

3. An organic optical recording medium as claimed in claim 1, wherein a glass transition temperature of said mixture of polymers is 40°–150° C.

4. An organic optical recording medium consisting essentially of:

a substrate;

a recording layer on the substrate;

a reflective layer; and a protective layer disposed on the recording layer, wherein said recording layer has a refractive index of 1.7 or less and includes an organic dye and a mixture of two polymers having different thermal properties which polymers are compatible at all temperatures from ambient temperature to 80° C., said recording layer having a plurality of thermal deformations in the form of physical changes in shape produced by thermal expansion differences between said two or more polymers, said thermal deformations forming a recording portion formed in a surface thereof.

* * * * *